(12) United States Patent
Hafeez et al.

(10) Patent No.: US 9,454,907 B2
(45) Date of Patent: Sep. 27, 2016

(54) SYSTEM AND METHOD FOR PLACEMENT OF SENSORS THROUGH USE OF UNMANNED AERIAL VEHICLES

(71) Applicants: Usman Hafeez, Chicago, IL (US); David Mauer, Chicago, IL (US)

(72) Inventors: Usman Hafeez, Chicago, IL (US); David Mauer, Chicago, IL (US)

( * ) Notice: Subject to any disclaimer, the term of this patent is extended or adjusted under 35 U.S.C. 154(b) by 0 days.

(21) Appl. No.: 14/716,850

(22) Filed: May 19, 2015

(65) Prior Publication Data
US 2016/0232794 A1 Aug. 11, 2016

Related U.S. Application Data

(63) Continuation-in-part of application No. 14/616,663, filed on Feb. 7, 2015.

(51) Int. Cl.
*G05D 1/00* (2006.01)
*G08G 5/00* (2006.01)
*B64C 39/02* (2006.01)

(52) U.S. Cl.
CPC ........... *G08G 5/0034* (2013.01); *B64C 39/024* (2013.01); *G08G 5/0043* (2013.01); *B64C 2201/00* (2013.01)

(58) Field of Classification Search
CPC ................. B64C 2201/128; B64C 2201/126; G05D 1/104
See application file for complete search history.

(56) References Cited

U.S. PATENT DOCUMENTS

| | | |
|---|---|---|
| 5,240,207 A | 8/1993 | Eiband et al. |
| 5,521,817 A | 5/1996 | Burdoin et al. |
| 5,862,401 A | 1/1999 | Barclay, Jr. |
| 6,735,630 B1 | 5/2004 | Gelvin et al. |
| 6,826,607 B1 | 11/2004 | Gelvin et al. |
| 6,859,831 B1 | 2/2005 | Gelvin et al. |

(Continued)

FOREIGN PATENT DOCUMENTS

| | | |
|---|---|---|
| WO | WO2014047720 A1 | 4/2014 |
| WO | WO2014064431 A2 | 5/2014 |

OTHER PUBLICATIONS

Voldsund, Vegard; Drop and Recovery of Sensor Nodes Using UAVs, Norwegian University of Science and Technology, Jun. 2014.*

(Continued)

*Primary Examiner* — Khoi Tran
*Assistant Examiner* — Ryan Rink
(74) *Attorney, Agent, or Firm* — Kevin Keener; Keener and Associates P.C.

(57) ABSTRACT

The invention is directed toward a system and method for placing, activating, and testing sensors. The system comprises one or more server computers, one or more communication hubs, one or more unmanned aerial vehicles, and one or more sensors. The method comprises the steps of receiving geographic sensor placement locations, receiving sensor parameters, determining the geographic location of sensors, respectively sending location query signals to the unmanned aerial vehicles, respectively receiving location reply signals from the unmanned aerial vehicles, and calculating a geographic flight path for the unmanned aerial vehicles. The method also comprises calculating mission objectives and the energy needs of the unmanned aerial vehicles to complete the mission objectives. The method then determines the most efficient combination of unmanned aerial vehicles to complete the mission objectives and assigns the tasks to the unmanned aerial vehicles. The unmanned aerial vehicles place, activate, and test the sensors.

20 Claims, 8 Drawing Sheets

(56) References Cited

U.S. PATENT DOCUMENTS

| | | | |
|---|---|---|---|
| 7,020,701 B1 | 3/2006 | Gelvin et al. | |
| 7,143,087 B2 | 11/2006 | Fairweather | |
| 7,685,083 B2 | 3/2010 | Fairweather | |
| 7,797,367 B1 | 9/2010 | Gelvin et al. | |
| 7,844,687 B1 | 11/2010 | Gelvin et al. | |
| 7,860,680 B2 | 12/2010 | Arms et al. | |
| 8,103,398 B2 | 1/2012 | Duggan et al. | |
| 8,140,658 B1 | 3/2012 | Gelvin et al. | |
| 8,290,706 B2 | 10/2012 | Tsutsui | |
| 8,515,609 B2 | 8/2013 | McAndrew et al. | |
| 8,676,406 B2 | 3/2014 | Coffman et al. | |
| 8,708,285 B1* | 4/2014 | Carreiro | B64C 39/028 244/190 |
| 8,832,244 B2 | 9/2014 | Gelvin et al. | |
| 8,914,182 B2* | 12/2014 | Casado | G05D 1/0088 701/24 |
| 9,174,733 B1* | 11/2015 | Burgess | B64D 1/12 |
| 2009/0316755 A1* | 12/2009 | Collette | G05D 1/0044 375/133 |
| 2010/0224732 A1 | 9/2010 | Olson et al. | |
| 2010/0286859 A1 | 11/2010 | Feigh et al. | |
| 2011/0029804 A1* | 2/2011 | Hadden | G05B 15/02 714/1 |
| 2011/0093139 A1 | 4/2011 | Arms et al. | |
| 2012/0143482 A1 | 6/2012 | Goossen et al. | |
| 2012/0199698 A1 | 8/2012 | Thomasson et al. | |
| 2012/0290152 A1* | 11/2012 | Cheung | G01S 7/003 701/2 |
| 2013/0012231 A1 | 1/2013 | Hall | |
| 2013/0128050 A1 | 5/2013 | Aghdasi et al. | |
| 2013/0260783 A1 | 10/2013 | Agrawal et al. | |
| 2013/0320212 A1 | 12/2013 | Valentino et al. | |
| 2013/0325212 A1 | 12/2013 | Wickman | |
| 2013/0345920 A1 | 12/2013 | Duggan et al. | |
| 2014/0032034 A1* | 1/2014 | Raptopoulos | G08G 5/0069 701/25 |
| 2014/0067162 A1 | 3/2014 | Paulsen et al. | |
| 2014/0163852 A1 | 6/2014 | Borri et al. | |
| 2014/0222248 A1* | 8/2014 | Levien | B64C 39/024 701/2 |
| 2014/0249693 A1* | 9/2014 | Stark | B64C 39/024 701/2 |
| 2014/0278150 A1 | 9/2014 | Baesler et al. | |
| 2014/0316614 A1 | 10/2014 | Newman | |
| 2015/0120094 A1* | 4/2015 | Kimchi | B64C 39/024 701/3 |
| 2015/0158587 A1* | 6/2015 | Patrick | B64C 39/024 244/137.4 |
| 2015/0234387 A1* | 8/2015 | Mullan | G05D 1/0291 701/3 |
| 2016/0059963 A1* | 3/2016 | Burgess | B64D 1/12 701/49 |

OTHER PUBLICATIONS

Yen et al. "Smart Utility Poles" University of Tennessee, Knoxville. Available at http://trace.tennessee.edu/cgi/viewcontent.cgi?article=1027&context=utk_elecpubs.

Levin, David. "Futuristic Inspections for Bridge Safety" TuftsNow. Available at http://now.tufts.edu/articles/futuristic-inspections-bridge-safety.

Chant, Ian. "Drone Fleets Could Monitor Bridge Safety" IEEE Spectrum. Available at http://spectrum.ieee.org/tech-talk/robotics/aerial-robots/drones-could-monitor-bridge-safety.

Abstact CN103197683 "Method for intelligently controlling flight heights and attitudes of quad-rotor unmanned helicopters." Available at https://www.google.com/patents/CN103197683A.

Abstract CN102566580 "Unmanned helicopter flight track planning method." Available at https://www.google.com/patents/CN102566580A.

Abstract CN202679644 "Wireless system of unmanned aerial vehicle based on 3G and WIFI," Available at https://www.google.com/patents/CN202679644U.

Abstract CN202713632 "Unmanned aerial vehicle multichannel wireless link system based on WIFI." Availabl at ttps://www.google.com/patents/CN202713632U.

\* cited by examiner

SYSTEM AND METHOD FOR PLACEMENT OF SENSORS THROUGH USE OF UNMANNED AERIAL VEHICLES

PRIORITY

This application is a continuation-in-part of, and claims benefit of U.S. application Ser. No. 14/616,663 filed Feb. 7, 2015.

FIELD OF INVENTION

The invention pertains generally to sensors and unmanned aerial vehicles and more particularly to a system and method for planning and determining the placement and verifying the operability of data gathering sensors through the use of unmanned aerial vehicles.

BACKGROUND OF INVENTION

The use of Unmanned Aerial Vehicles (UAVs), otherwise known as drones, is a growing market and their use for multiple purposes is expected to grow exponentially within the next few years. UAVs can be used for any number of purposes. UAVs can fly over parts of land to give aerial views of land for planning purposes. One particularly beneficial use of drones is the placement and testing of environmental sensors.

Currently, autonomous UAVs are given a mission directive. The mission directive may be any set of instructions to be fully executed by the UAV. As one example, an autonomous UAV may be given a flight path and a set of tasks to perform while flying on the flight path. The tasks may be any type of task, such as photographing a specific landscape or delivering a package. The UAV executes the mission directive by flying along the flight path and by executing all assigned tasks during flight. The standard flight path for the UAV is designed such that the origination point and the destination point are the same place.

The current state of the art is limited though. In order to gather data at a specific location under the current state of the art, a UAV specially and specifically equipped with the right sensors would need to make multiple passes along a given path, or hover at a given location until its energy runs out. Weather conditions can also limit the ability to fly UAVs at certain times, adding an additional challenge. Therefore, there is no simple, cost effective, and reliable way to use UAVs to gather data for a longer term or to gather continuous data.

In the current state of the art there is an assumption that a mission directive to gather data is to be executed by a single specially and specifically equipped UAV. Therefore, if there are any problems or issues that develop with that UAV when it is executing its mission directive, the entire mission directive is compromised or delayed. What is needed is a system whereby a mission directive to gather data by various sensors can be allocated to the appropriate UAV(s) such that a partial set of data gathering tasks in a mission are completed by an optimal set of UAVs. Furthermore, in this system of multiple UAVs, what is needed is a method of assigning an initial mission directive to an appropriately chosen UAV.

In addition, the placement of sensors in the environment is a difficult task. Sensors can be used for any number of reasons, such as sampling and measuring air composition, measuring the structural integrity of man-made structures, collecting visual data for variety of uses such as assessing road traffic data, or detecting wild animal populations in the environment. The placement of these sensors is traditionally performed in person. This method presents a limitation though in that it is desirable to place sensors in remote locations which may be impractical or impossible to reach manually. Therefore it is desirable to have the ability to place and test sensors through the use of automated drones. In addition, the placement of sensors by drones is limited in that the planning and execution of the placement of the sensor is difficult, particularly when planning the placement of multiple sensors. What is needed is a simplified method and system for the placement, management, and testing of environmental sensors with automated drones.

SUMMARY OF INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed to significantly more than just an abstract idea requiring no more than a generic computer to perform a generic computer function. The method disclosed herein is performed by a combination of computer systems, specialized unmanned aerial vehicles, and specialized sensors. As an illustrative example, the unmanned aerial vehicles disclosed herein comprise sensor modules and sensor placement modules. Furthermore the sensors disclosed herein comprise environmental sensor units. In addition, the method utilizes a series of communication hubs. Therefore, the method performed by the combination of the individual components, and the claims directed thereto, are patentable subject matter.

The invention is directed toward a method and system for remotely placing and testing sensors by one or more unmanned aerial vehicles. The invention is directed toward a computerized method for remotely placing and testing sensors by one or more unmanned aerial vehicles comprising a method performed on a computer system and a method performed on an unmanned aerial vehicle. The computer system comprises one or more transceivers, one or more microprocessors, and one or more nonvolatile memory units. The one or more nonvolatile memory units store instructions which when executed by the one or more microprocessors cause the computer system to perform operations comprising receiving one or more geographic sensor placement locations, receiving one or more sensor parameters, determining the geographic location of one or more sensors, respectively sending (via the one or more transceivers) one or more location query signals to the one or more unmanned aerial vehicles, respectively receiving (via the one or more transceivers) one or more location reply signals from the one or more unmanned aerial vehicles, and calculating a geographic flight path for the one or more unmanned aerial vehicles. The one or more sensor parameters is selected from the group consisting essentially of: the type of sensor desired for placement, duration of placement of the sensor, the environmental attribute to be measured by the sensor. The one or more sensors have one or more attributes consistent with the one or more received sensor parameters. The one or more sensors are configured to be carried by one or more unmanned aerial vehicles. The flight path includes the geographic locations of the one or more sensors and the geographic sensor placement locations. The one or more unmanned aerial vehicles each comprise a flight means, one or more transceivers, one or more microprocessors and one or more nonvolatile memory units. The one or more nonvolatile memory units store instructions which when executed by the one or more microprocessors cause the one or more aerial vehicles to perform operations comprising respectively receiving (via the one or more transceivers) a location query signal, respectively determining the geographic location of the one or more unmanned aerial vehicles, and respectively sending (via the one or more transceivers) a location reply signal to the computer system. The one or more unmanned aerial vehicles can respectively determine their locations via GPS or triangulation through signals sent to cellular towers or communication hubs.

In another embodiment, the method on the computer system further comprises calculating one or more mission objectives and calculating the energy needs of the one or more unmanned aerial vehicles required for executing the one or more mission objectives. The one or more mission objectives comprise placement of the one or more sensors at the one or more geographic sensor placement locations and executing flight along the geographic flight path. Furthermore, the computer system may also calculate the energy needs of the sensor or sensors to be used. The energy needs of the sensors to be used may be determined based on type of sensor, environmental attribute to be measured, operations to be performed by the sensor, and length of time for the sensor to be placed.

In another embodiment, the method on the computer system further comprises respectively sending (via the one or more transceivers) one or more power query signals to the one or more unmanned aerial vehicles, respectively receiving (via the one or more transceivers) one or more power reply signals from the one or more unmanned aerial vehicles, and determining whether the power supply on each respective unmanned aerial vehicle is sufficient to perform the calculated one or more mission objectives. The power reply signals indicating the respectively stored power supply on each respective unmanned aerial vehicle. In this embodiment, the method on the one or more unmanned aerial vehicles, each of which further comprise a power source, further comprises respectively receiving (via the one or more transceivers) the power query signal, respectively determining the amount of energy stored in the power source of each of the one or more unmanned aerial vehicles, and respectively sending (via the one or more transceivers) a power reply signal. Furthermore, the computer system may send a power query signal to the sensors to be placed. The sensors then determine the amount of stored energy in their respective power supplies and send a power reply signal to the computer system. The computer system may then correlate the information received to select the appropriate sensors and unmanned aerial vehicles for completing the mission objectives.

In another embodiment, the method on the computer system further comprises receiving a preferred distance from the geographic flight path, calculating the geographic position of one or more unmanned aerial vehicles within the preferred distance from the geographic flight path, and calculating the geographic position of one or more sensors within the preferred distance from the geographic flight path.

In another embodiment, the method on the computer system further comprises generating a list of one or more unmanned aerial vehicles within the preferred distance of the geographic flight path, wherein the one or more unmanned aerial vehicles are have access to one or more sensors within the preferred distance from the geographic flight path. In another embodiment, the method on the computer system further comprises selecting one or more unmanned aerial vehicles from the generated list. The method on the computer system may further comprise selecting one or more sensors accessible to the one or more unmanned aerial vehicles from the generated list and creating one or more mission objectives for placement of the one or more selected sensors at the one or more geographic sensor placement locations.

In another embodiment, the method on the computer system further comprises assigning the one or more mission objectives to the one or more selected unmanned aerial vehicles, generating one or more sets of instructions, wherein the sets of instructions comprises one or more tasks required for execution of the one or more mission objectives by the one or more selected unmanned aerial vehicles, and transferring (via the one or more transceivers) the one or more sets of instructions to the one or more selected unmanned aerial vehicles. In this embodiment, the method on the one or more unmanned aerial vehicles further comprises receiving (via the one or more transceivers) the one or more sets of instructions. The method on the one or more unmanned aerial vehicles further comprises executing the one or more sets of instructions.

In another embodiment, the method on the computer system further comprises determining one or more specific arrival times for the one or more unmanned aerial vehicles to arrive at the one or more geographic sensor locations, sending an arrival notification signal to a selected user, receiving user specific sensor placement instructions, and transmitting (via the one or more transceivers) the user specific sensor placement instructions to the one or more unmanned aerial vehicles. The user specific sensor placement instructions comprise one or more exact sensor placement sites. In this embodiment, the method on the one or more unmanned aerial vehicles further comprises receiving (via one the or more transceivers) user specific sensor placement instructions and determining the distance from the one or more unmanned aerial vehicles to the one or more exact sensor placement sites. The method on the one or more unmanned aerial vehicles may further comprise placing the one or more sensors at the one or more exact sensor placement sites.

In another embodiment, the method on the one or more unmanned aerial vehicles further comprises sending (via the one or more transceivers) one or more sensor activation signals to the one or more sensors, sending (via the one or more transceivers) one or more operational verification signals to the one or more sensors, receiving (via the one or more transceivers) one or more confirmation signals from the one or more sensors, and transmitting (via the one or more transceivers) the one or more confirmation signals to the computer system. In this embodiment the method is further performed the one or more sensors, each comprising one or more transceivers, one or more microprocessors, and one or more nonvolatile memory units. The one or more nonvolatile memory units store instructions which when executed by the one or more microprocessors cause the one or more sensors to perform operations comprising receiving one or more operational verification signals from the one or more unmanned aerial vehicles, activating the sensor operations in response to receiving said one or more sensor activation signals, receiving one or more operational verification signals from the one or more unmanned aerial vehicles, determining that the one or more the sensors is functioning properly, and sending one or more confirmation signals to the one or more unmanned aerial vehicles if the one or more sensors is functioning properly.

In an alternative embodiment of the invention, the method on the computer system may further comprise assigning the one or more mission objectives to the one or more selected unmanned aerial vehicles, generating one or more sets of instructions, wherein the sets of instructions comprises one or more tasks required for execution of the one or more mission objectives by the one or more selected unmanned aerial vehicles, and transferring (via the one or more transceivers) the one or more sets of instructions to one or more communication hubs. In this embodiment the method is further performed on the one or more communication hubs, each of which comprise one or more transceivers, one or more microprocessors and one or more nonvolatile memory units. The one or more nonvolatile memory units store instructions which when executed by the one or more microprocessors cause the one or more communication hubs to perform operations comprising receiving (via the one or more transceivers) the one or more sets of instructions and transmitting (via the one or more transceivers) the one or more sets of instructions to the one or more unmanned aerial vehicles. In this embodiment the method on the one or more unmanned aerial vehicles may further comprise receiving (via the one or more transceivers) the one or more sets of instructions and executing the one or more sets of instructions.

The invention is further directed toward a method for remotely placing and testing sensors by one or more unmanned aerial vehicles comprising receiving one or more geographic sensor placement locations, receiving one or more sensor parameters, determining the geographic location of one or more sensors, respectively sending one or more location query signals to the one or more unmanned aerial vehicles, respectively receiving one or more location reply signals from the one or more unmanned aerial vehicles, calculating a geographic flight path for the one or more unmanned aerial vehicles, calculating one or more mission objectives, calculating the energy needs of the one or more unmanned aerial vehicles required for executing the one or more mission objectives, determining whether the respective power supply on each of the one or more unmanned aerial vehicles is sufficient to perform the calculated one or more mission objectives independently or collectively, selecting one or more unmanned aerial vehicles having, independently or collectively, sufficient power supply to perform the calculated one or more mission objectives, assigning the one or more mission objectives to the one or more unmanned aerial vehicles, generating one or more sets of instructions, wherein the one or more sets of instructions comprises one or more tasks required for execution of the one or more mission objectives by the one or more selected aerial vehicles, transferring the one or more sets of instructions to the one or more selected unmanned aerial vehicles, and executing, by the one or more selected unmanned aerial vehicles, the one or more sets of instructions. The one or more sensor parameters is selected from the group consisting essentially of: the type of sensor desired for placement, duration of placement of the sensor, the environmental attribute to be measured by the sensor. The one or more sensors have one or more attributes consistent with the one or more received sensor parameters. The one or more sensors are configured to be carried by one or more unmanned aerial vehicles. The flight path includes the geographic locations of the one or more sensors and the geographic sensor placement locations. The one or more mission objectives comprise placement of the one or more sensors at the one or more geographic sensor placement locations and executing flight along the geographic flight path.

The method may further comprise determining one or more specific arrival times for the one or more unmanned aerial vehicles to arrive at the one or more geographic sensor locations, sending an arrival notification signal to a selected user, receiving user specific sensor placement instructions, transmitting the user specific sensor placement instructions to the one or more unmanned aerial vehicles, receiving, by the one or more unmanned aerial vehicles, the user specific sensor placement instructions, determining, by the one or more unmanned aerial vehicles, the distance from the one or more unmanned aerial vehicles to the one or more exact sensor placement sites, and placing, by the one or more unmanned aerial vehicles, one or more sensors at the one or more exact sensor placement sites. The user specific sensor placement instructions comprise one or more exact sensor placement sites.

The invention is also directed toward a system for remotely placing and testing sensors. The system comprises one or more server computers, one or more databases, one or more communication hubs, one or more unmanned aerial vehicles, and one or more sensors. The one or more server computer comprises a communication module, a mission module, and a flight path computation module. The database is communicatively coupled to the server computer. The one or more communication hubs comprising one or more transceivers, one or more microprocessors, and one or more nonvolatile memory units. The one or more communication hubs is communicatively coupled to the one or more server computers. The one or more unmanned aerial vehicles is communicatively coupled to the one or more communication hubs. The one or more unmanned aerial vehicles is communicatively coupled to the one or more server computers. The one or more aerial vehicle comprise one or more transceivers, one or more microprocessors, one or more nonvolatile memory units, one or more GPS units, one or more batteries, one or more flight means, one or more sensor placement modules, one or more sensor modules, and one or more cameras. The one or more sensors are configured to be carried by the one or more unmanned aerial vehicles. The one or more sensors is communicatively coupled to the one or more communication hubs. The one or more sensors is communicatively coupled to the one or more unmanned aerial vehicles. The one or more sensors is communicatively coupled to the one or more server computers. The one or more sensors comprise one or more transceivers, one or more microprocessors, one or more nonvolatile memory units, one or more environment detection units, one or more batteries, one or more attachment means, and one or more sensor encasements. The system may further comprise one or more client computers communicatively coupled to the server computer.

Other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. In addition, "component" may be used to refer to physical items or parts of the system, such as the mechanism that carries and releases the sensors to be placed by the UAV.

Figure 1:
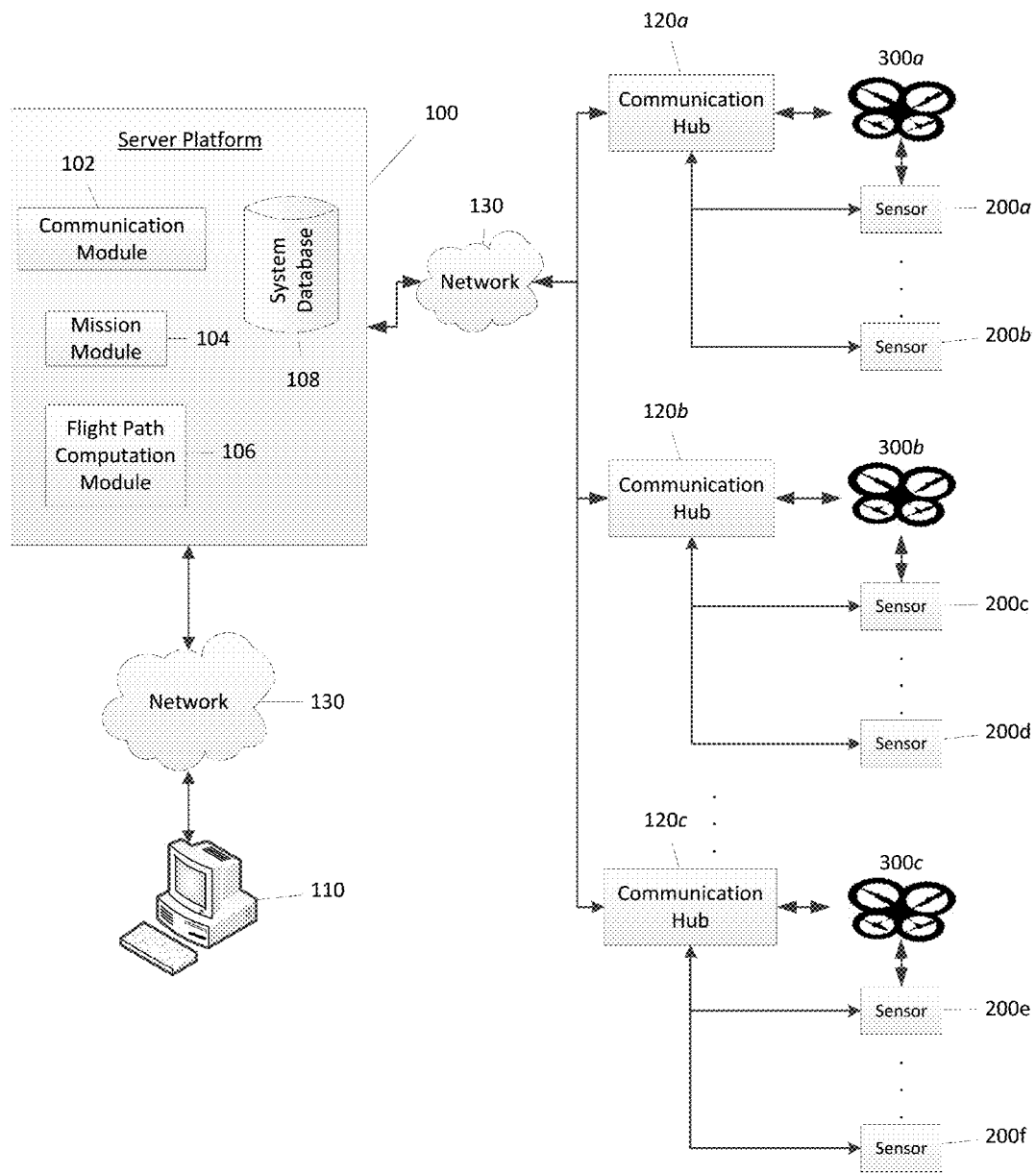
FIG. 1 is a view of the system of the invention.

The invention is directed toward a system and method for managing missions for the placement and verification of operability of data gathering sensors by UAVs. Referring to FIG. 1, the system of the invention is displayed. The system comprises a server computer 100 connected to a plurality of communication hubs 120a, 120b, 120c. Each communication hub 120a, 120b, 120c is configured to receive one or more sensors 200a, 200b, 200c. Each communication hub 120a, 120b, 120c may be configured to operate as a charging station, where a UAV 300 may land on a communication hub 120 to recharge the battery of the UAV 300. Additionally, each communication hub 120a, 120b, 120c or sensors 200a, 200b, 200c can be recharged via solar panels or another type of power source. Each communication hub 120a, 120b, 120c may be configured to receive one or more UAVs 300a, 300b, 300c for charging. Each communication hub 120a, 120b, 120c is configured to communicate with one or more UAVs 300a, 300b, 300c. Each communication hub 120a, 120b, 120c is configured to communicate with one or more UAVs 300a, 300b, 300c. A single communication hub 120 may receive a single UAV 300. In other embodiments a single communication hub 120 may receive multiple UAVs 300 simultaneously. The UAV 300 may also communicate with the server computer 100 through the communication hub 120. The server computer 100 can send mission details and executable instructions to the UAV 300. In other embodiments, each UAV 300a, 300b, 300c may also communicate directly with the server computer 100. The system may comprise any number of communication hubs 120 and any number of UAVs 300.

Each communication hub 120a, 120b, 120c may be communicatively coupled to one or more sensors 200a, 200b, 200c, 200d, 200e, 200f Each sensor 200 is configured to receive information from the immediate environment surrounding the sensor 200. The sensor 200 may be a camera configured to receive specific visual and audio information. The sensor 200 may be configured to detect specific chemicals, detect and measure air composition, detect and measure water composition, detect and measure soil composition, detect and measure vibrational energy, or any other type of environmental measurement.

The server computer 100 is communicatively coupled to a database 108. The database 108 stores all information about every UAV 300a, 300b, 300c connected to the server computer 100. The database 108 may store any relevant information pertaining to the system such as UAV location, missions being performed by each UAV, mission history, battery power levels of each UAV, time for execution of any mission, location of any sensor, information recorded by any sensor, type of each sensor, and any other relevant information. Furthermore, the database 108 may store the data gathered by sensor 200.

Users may interact with the server computer 100 directly or through a client device 110 connected to the server computer 100 through a network 130. The client device 110 may be any type of computerized device utilized by a user to communicate with the server computer 100. The client device 110 may be a desktop computer, a laptop computer, a tablet computer, a wireless cellular phone, or any other type of communicative computerized device.

The server computer 100 stores and executes a series of software modules, including a communication module 102, a mission module 104, and a flight path computation module 106. The communication module 102 determines the location of a UAV 300 and transmits instructions to be executed by a UAV 300. Each UAV 300a, 300b, 300c has a specific communication ID number which permits the communication module 102 to track and send specific instructions to each respective UAV 300a, 300b, 300c. The communication ID number can be any number assigned to each respective UAV 300a, 300b, 300c that permits the system to independently identify each respective UAV 300a, 300b, 300c, such as a unique IP address. The communication module 102 may communicate with a UAV 300 through a communication hub 120 or directly through a network connection 130, such as the internet or a cellular connection.

The communication module 102 determines the location of each sensor 200a, 200b, 200c, 200d, 200e, 200f and receives readings from each sensor 200a, 200b, 200c, 200d, 200e, 200f The communication module 102 may transmit instructions to be executed by each sensor 200a, 200b, 200c, 200d, 200e, 200f Each sensor 200a, 200b, 200c, 200d, 200e, 200f has a specific communication ID number which permits the communication module 102 to track and send specific instructions to each respective sensor 200a, 200b, 200c, 200d, 200e, 200f The communication ID number can be any number assigned to each respective sensor 200a, 200b, 200c, 200d, 200e, 200f that permits the system to independently identify each respective sensor 200a, 200b, 200c, 200d, 200e, 200f such as a unique IP address. The communication module 102 may communicate with a sensor 200 through a communication hub 120 or directly through a network connection 130, such as the internet or a cellular connection.

The mission module 104 computes and tracks each mission executed by each UAV 300. When a user assigns a mission to the system to be executed, the mission module 104 determines the start point and end point of the mission and which respective UAVs 300a, 300b, 300c are needed to execute the mission. The mission module 104 then determines the specific instructions to send to the respective UAVs 300a, 300b, 300c and assigns the mission to the proper UAVs 300a, 300b, 300c.

The flight path computation module 106 determines the proper flight path for each UAV 300a, 300b, 300c to maximize efficiency in time and battery life for each UAV 300a, 300b, 300c. The flight path computation module 106 determines the proper flight path from the starting point to the end point of the mission. The flight path computation module 106 determines the communication hubs 120a, 120b, 120c which are along the proper flight path which may be used by the specific UAVs executing the mission. The flight path computation module 106 may also determine the number and type of sensor 200 that are carried on each UAV 300a, 300b, 300c.

Figure 2:
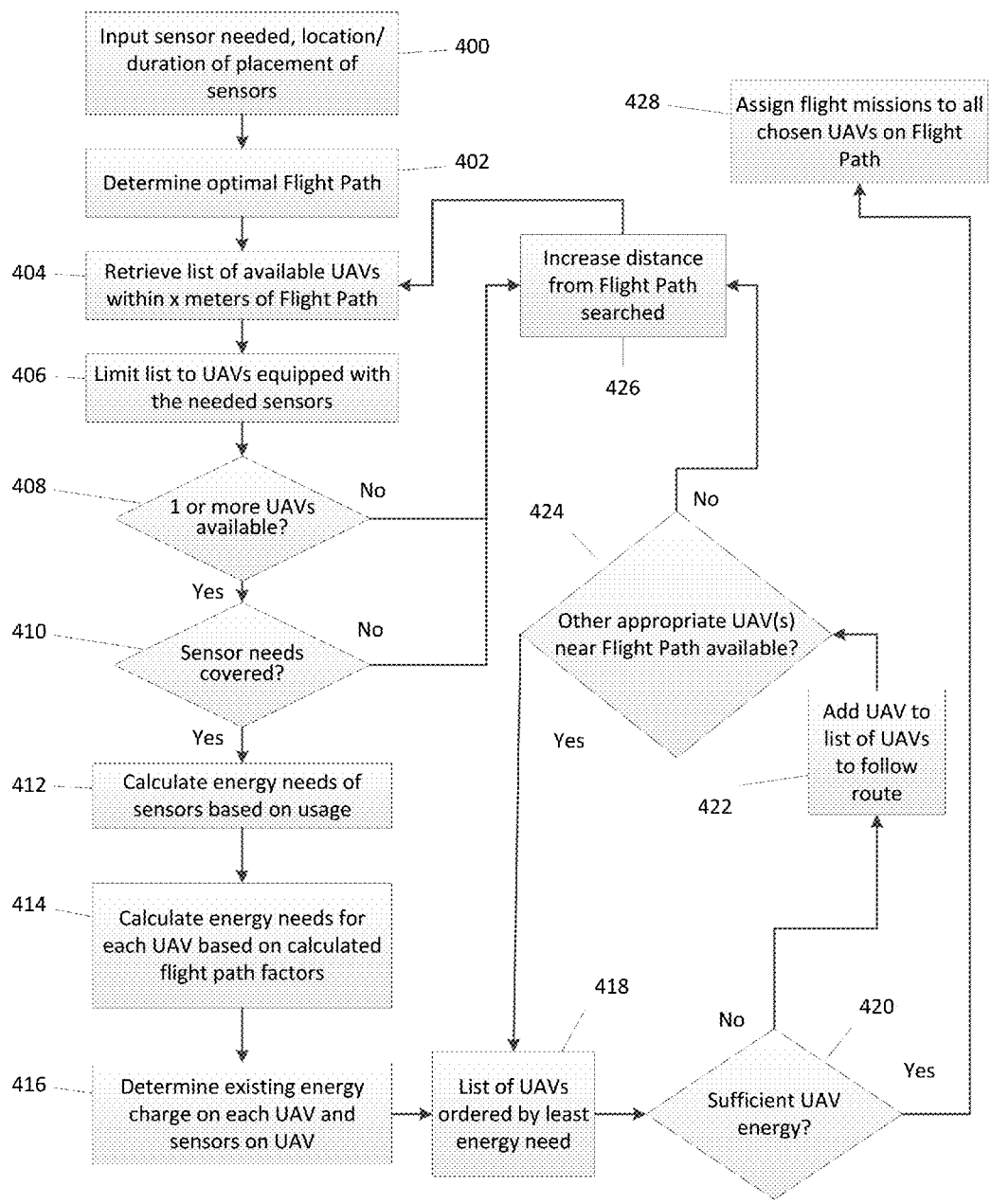
FIG. 2 is a diagram of a method of utilizing the invention.

Referring to FIG. 2, the method of utilizing the invention is illustrated. The process starts when a user inputs the sensor or sensors needed, the placement location of each sensor, and the duration of placement of each sensor 400. The system then determines the optimal flight path to be taken by a UAV 402. The system retrieves a list of available UAVs within a predetermined distance from the flight path 404. The system then limits the list of UAVs to those equipped with the necessary type of sensor 406. The system determines if one or more UAVs are available 408. If no UAVs are available then the system increases the predetermined distance from the optimal flight path and repeats the search for available UAVs 426. If one or more UAVs are available then the system determines whether the sensor needs of the user are met with the list of UAVs retrieved 410. If they are not then the system increases the predetermined distance from the optimal flight path and repeats the search for available UAVs 426. If the sensor needs of the user are met then the system calculates the energy needs of the sensors based on anticipated usage 412. The system then calculates the energy needs for each UAV based on calculated flight path factors 414. The flight path factors can be any element or characteristic affecting the calculated flight path. The flight path factors may include, but not be limited to, distance of the UAV to the flight path, distance of the flight path from the UAV to the sensor placement location, and distance of the flight path to the next charging station housing the appropriate UAV with the needed sensors.

The system then determines the existing energy charge on each UAV and each of the sensors on each UAV 416. The system then lists the UAVs ordered by the least amount of energy needed 418. The system then determines whether there is sufficient energy on the UAV 420. If there is not sufficient energy, the system adds the UAV to a list of multiple UAVs to follow the route 422. The system then determines if there are other appropriate UAVs near the flight path that are available 424. If there are other appropriate UAVs available then the system adds the UAV to the list of UAVs ordered by least amount of energy needs 418. If no other appropriate UAVs are available near the flight path then the predetermined distance from the flight path is increased and the system repeats the search 426. If, however, there is sufficient energy on the one or more UAVs chosen then the system assigns the flight missions to all of the chosen UAVs 428.

Figure 3:
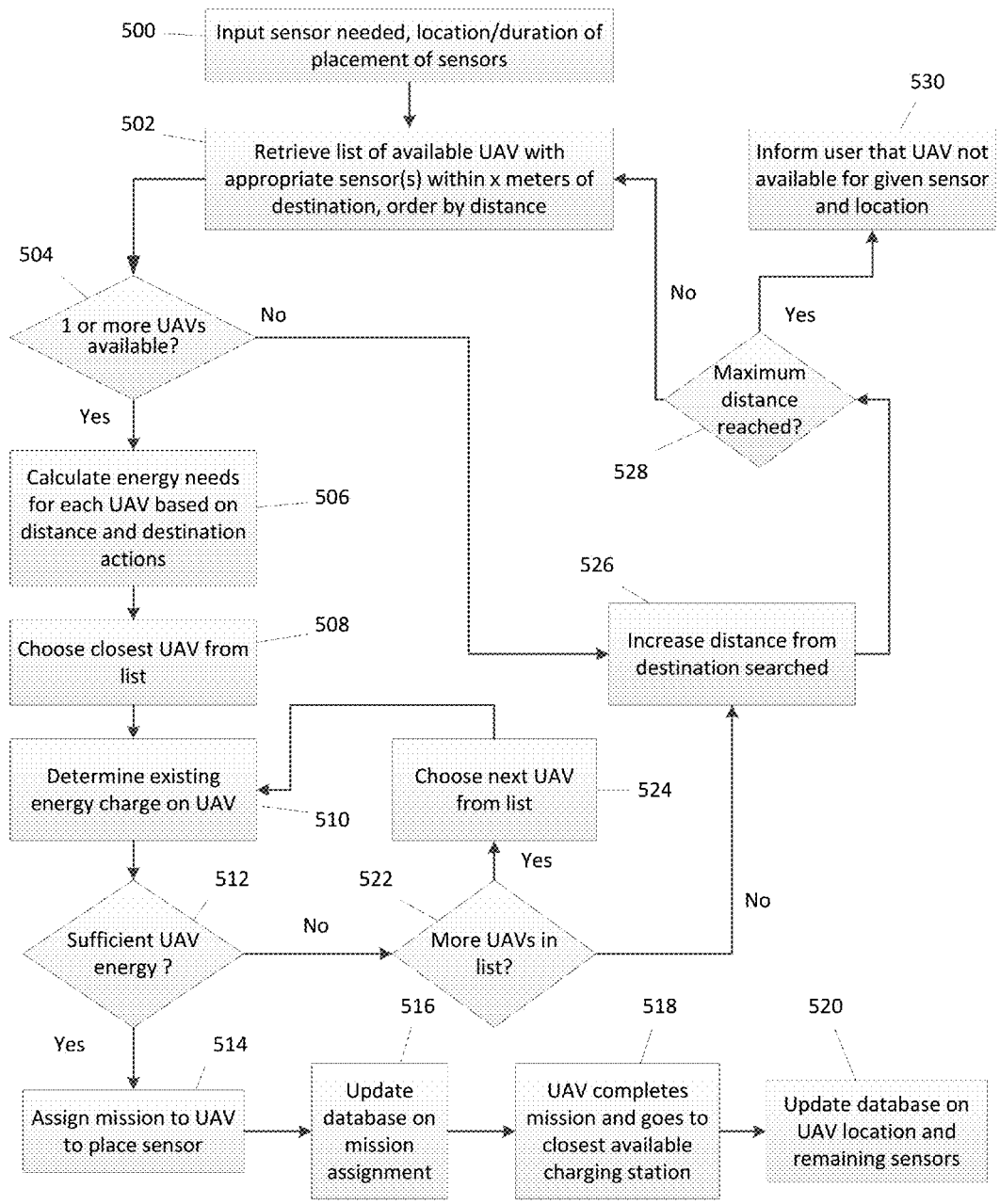
FIG. 3 is a diagram of a method of utilizing the invention.

Referring to FIG. 3, the selection and assignment method based on sensor needs is further displayed. First, the user inputs the type of sensor needed, the placement location of the sensor, and the duration of placement of the sensor 500. The system then retrieves a list of all available UAVs with the appropriate sensor that are within a predetermined distance from the destination and orders the UAV by distance 502. The system then determines whether one or more UAVs are available. If no UAVs are available then the system increases the distance searched 526. The system may determine whether the maximum flight distance has been reached 528. If the maximum flight distance has been reached and no UAVs are found then the system informs the user that no UAV is available for the chosen sensor and chosen location 530. If there are UAVs available within the maximum distance searched then the system adds the UAVs to the list and orders the UAVs by distance from the destination 502.

If one or more UAVs are available then the system calculates the energy needs for each UAV based on distance to the destination and actions required to be performed at the destination 506. The system then chooses the closest UAV to the destination from the list 508. The system then determines the existing energy charge on the UAV 510. The system then determines whether there is sufficient energy on the UAV 512. If there is sufficient energy on the UAV then the system assigns the mission to the UAV to place the sensor 514. The system then updates the database regarding the mission assignment 516. The UAV then completes the mission and goes to the nearest charging station 518. After that the system updates the database regarding the location of the UAV and any sensors remaining on the UAV 520.

If, however, the system determines that there is insufficient energy on the chosen UAV then the system determines whether there are more UAVs on the list 522. If the system determines that there are more UAVs then the system chooses the next UAV 524. The system then determines whether there is sufficient charge on the next UAV 510 and repeats the process. If there are not more UAVS on the list then the system increases the predetermined distance from the destination and repeats the search for UAVs 526.

Figure 4:
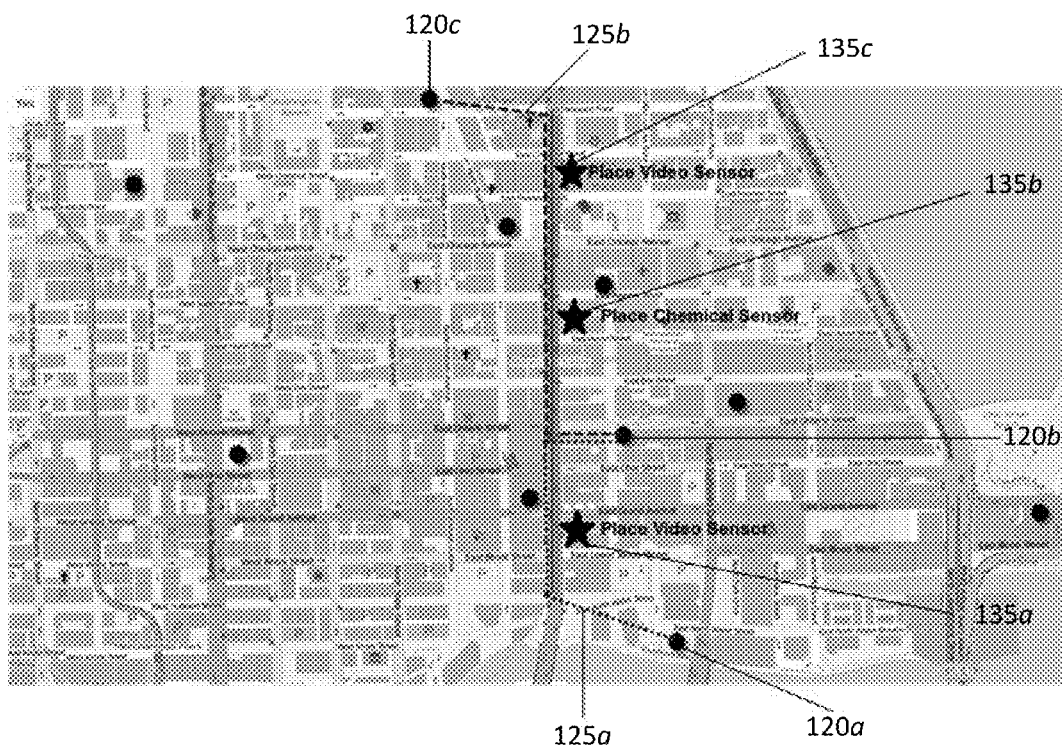
FIG. 4 is a view of a theoretical flight path.

Referring to FIG. 4, a hypothetical flight path is displayed. In the displayed flight path a UAV 300 starts at a first communication hub 120a, which is also a charging station. The UAV 300 follows a first leg of a flight path 125a from the first communication hub 120a to a second communication hub 120b, which is also a charging station. Along the first leg of the flight path 125a the UAV stops at the first destination location 135a to place one or more sensors 200. In the hypothetical flight path shown, the first sensor 200 placed at the first destination location 135a is a video sensor. From the second communication hub 120b to a third communication hub 120c, which are both charging stations, is a second leg of the flight path 125b. Along the second leg of the flight path 125b the UAV 300 stops at a second destination location 135b and a third destination location 135c. In the hypothetical flight path shown, the second sensor 200 placed at the second destination location 135b is a chemical sensor and the third sensor 200 placed at the third destination location 135c is a video sensor. A single UAV 300 may fly both the first leg of the flight path 125a and the second leg of the flight path 125b. Alternatively, a first UAV 300a may fly the first leg of the flight path 125a and a second UAV 300b may fly the second leg of the flight path 125b. In using the system, a user selects the destination locations 135a, 135b, 135c and the type of sensor 200 desired for each destination location 135a, 135b, 135c. The system then determines the proper UAVs 300 to perform the placement of the sensors 200, and the flight path to be taken by each UAV 300.

Figure 5:
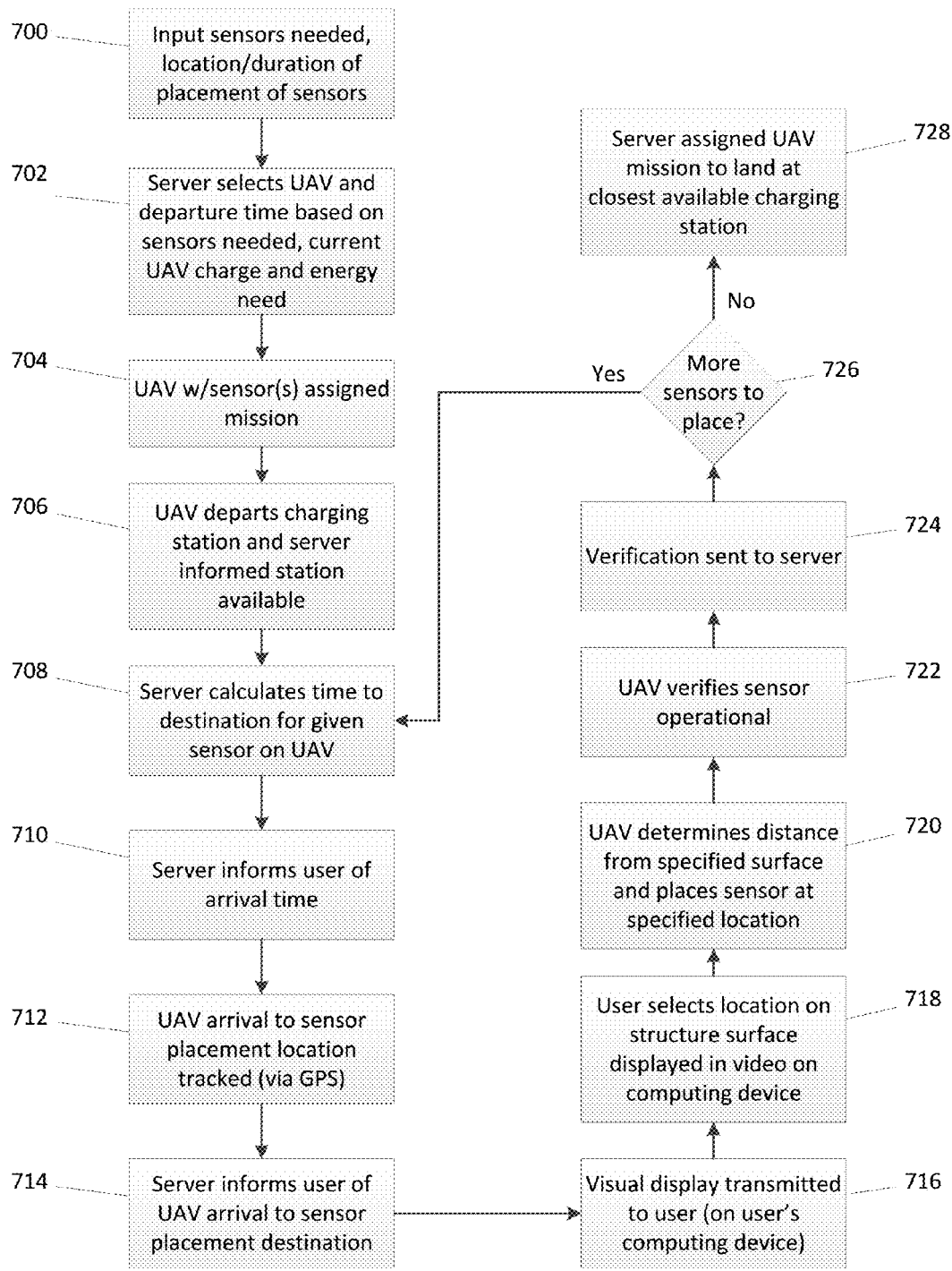
FIG. 5 is a diagram of a method of utilizing the invention.

Referring to FIG. 5, the method of assigning and placing sensors 200 by one or more UAVs 300 is displayed. The method starts when a user inputs the types of sensors needed, the location for placement of the sensors, and the duration of placement of the sensors 700. The system then selects the UAV departure time based on sensors needed, current battery charge held by the UAV, and the energy needed to complete the mission of placing the sensor 702. The system then assigns the mission to the selected UAV with appropriate sensors 704. The UAV departs the charging station and the server is informed that the charging station is available 706. The server calculates the time to the destination for the given UAV 708. The server sends a notification signal to the user that the UAV is in flight and informs the user of the anticipated arrival time 710. The notification signal sent by the server may be any type of electronic message, including but not limited to email, text message, automated phone call, instant message, computer pop-up message, or any other notification means.

The UAV arrives at the destination location for sensor placement 712. The position of the UAV is tracked via a GPS signal, but the position of the UAV may also be tracked through triangulation of the signals the UAV can send to multiple communication hubs 120. When the UAV arrives at the placement location the server sends a notification signal to the user and informs the user of the UAV arrival 714. The user may then log in to the system and is presented a visual display transmitted from the camera on the UAV to the user's client device 716. The user may then select the specific location on the image presented, such as a specific structure or part of a structure, a tree, a rock, or any other place or item, where the UAV is instructed to place the chosen sensor 718. The UAV determines the distance from the specified surface and places the sensor at the chosen location 720. After placement of the sensor, the UAV verifies that the sensor is operational 722. The UAV may verify that the sensor has sufficient power, can make sufficient readings, or otherwise is functioning properly or in the manner which is desired by the user. The UAV notifies the server of the successful verification and that the sensor is operating sufficiently 724. The system then determines whether the UAV has other sensors to place 726. If there are more sensors to place then the server calculates the time to the next destination 708. If there are no more sensors to place then the server instructs the UAV to land at the closest available charging station 728.

The placement of the sensor by the UAV 300 at the spot chosen by the user may be completed through a number of mechanisms. The user may specify the global coordinates and distance from the ground. The user may specify the location on the surface of an object (such as "on the roof of the building"). The user may also specify specific values on a Cartesian grid, such as an x, y, and z value, to instruct the UAV 300 to place the sensor 200 at a specific location in three dimensional space. The values may be relative to the UAV 200 itself, or relative to a specific point in the environment (such as corner of a building, or a specific rock or tree, or a distance from another sensor). The UAV 300 may determine specific distances for placement of the sensor through a variety of means. The UAV 300 may determine distance through non-tactile means, such as by sonar, by video, or laser range finder. Alternatively the UAV 300 may determine distance through tactile means, such as by an arm extending from the body of the UAV 300 that senses when physical contact is made. The user can is also able to fine tune the location of the sensor by using the video generated from the UAV on a computing device and pinpointing a specific location on the user's computing device (e.g. tablet, phone, etc.)

Figure 6:
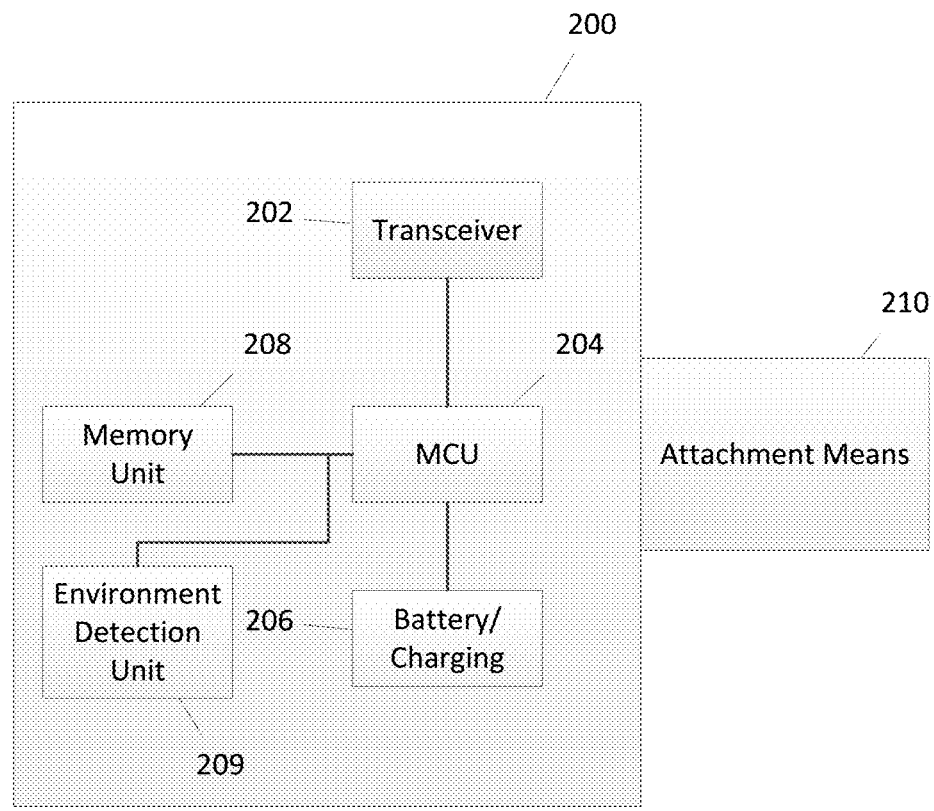
FIG. 6 is a schematic of a sensor.

Referring to FIG. 6, the preferred embodiment of the sensor 200 is displayed. The sensor comprises a transceiver 202, a central processing unit 204, a battery/charging unit 206, a memory unit 208, an environment detection unit 209, and an attachment means 210. The central processing unit 204 executes instructions and manages the operations of the sensor 200. The central processing unit is communicatively coupled to the transceiver 202, the memory unit 208, the power source 206, and the environment detection unit 209. The memory unit 208 is any type of data storage component and may store information about the about current missions or objectives being executed by the sensor 200, the location of the nearest communication hub 120, as well as any other relevant information. Additionally the memory unit 208 may be utilized to buffer data streams received from the server computer 100 or charging station 20 communication hub 120. The transceiver 202 sends and receives information to and from the server computer 100, communication hub 120, or UAV 300. In other embodiments the transceiver 202 may send and receive information through a wireless cellular network. The system may transmit mission data through the wireless cellular network. The information received in the transceiver 202 from the wireless cellular network may also permit the sensor 200 to triangulate its position based on signals received from cellular phone towers. In some embodiments the sensor 200 may further comprise a GPS unit (not shown). The GPS unit 312 determines the global position of the sensor 200. The power source 206 may be any type of battery configured to meet the energy needs of the sensor 200 to ensure power for the operation of the central processing unit 306, the transceiver 302, the memory unit 308, the GPS unit, and the environment detection unit 209. The power source may also comprise a charging means, the charging means being any component or circuitry configured to receive energy to resupply energy to the power source 206.

The environment detection unit 209 is any type of component configured to detect the environment of the sensor 200. The environment detection unit 209 may be a single shot camera, a video camera, a light detector, a chemical detector, a motion detector, or any other type of sensor. The environment detection unit 209 may detect chemicals, it may detect and measure the composition of the atmosphere, it may detect radiation, it may detect movement, it may detect airflow, or it may measure and detect any other attribute, characteristic, or element of the environment.

The sensor 200 may further comprise an attachment means 210. The attachment means 210 is any mechanism or structure configured to permit the sensor 210 to be attached to another item. The attachment means 210 permits the sensor 200 to be adhered to an object in the environment while the sensor 200 is operational. For instance, a user may desire to attach a sensor 200 to a building, to a tree, to a bridge, or to any other natural or manmade structure. The attachment means 210 may permanently adhere the sensor 200 to the desired object. Alternatively, the attachment means 210 may removably secure the sensor 200 to the desired object. The attachment means 210 may comprise one or more nails, one or more screws, hook and loop tape, one or more elastic bands, one or more clamps, one or more sections of rope, one or more ribbons, one or more sections of tape, any type of contact adhesive, electrostatic adhesion, directional dry cohesion, heat activated adhesive, electrically activated adhesive, or a combination thereof. The UAV 300 selected for a specific mission may be dependent on the surface on which the sensor 200 is to be placed. For instance, one UAV 300 may only place sensors 200 utilizing a contact adhesive or glue adhesive for securing the sensor 200 to glass while another UAV 300 may only place sensors 200 utilizing clamps for securing the sensor 200 to outcroppings such as a branch of a tree. In other embodiments, the UAV 300 chosen for a mission may be independent of the attachment means 210, wherein a UAV 300 carries a number of sensors 200 with a variety of attachment means 210.

Figure 7:
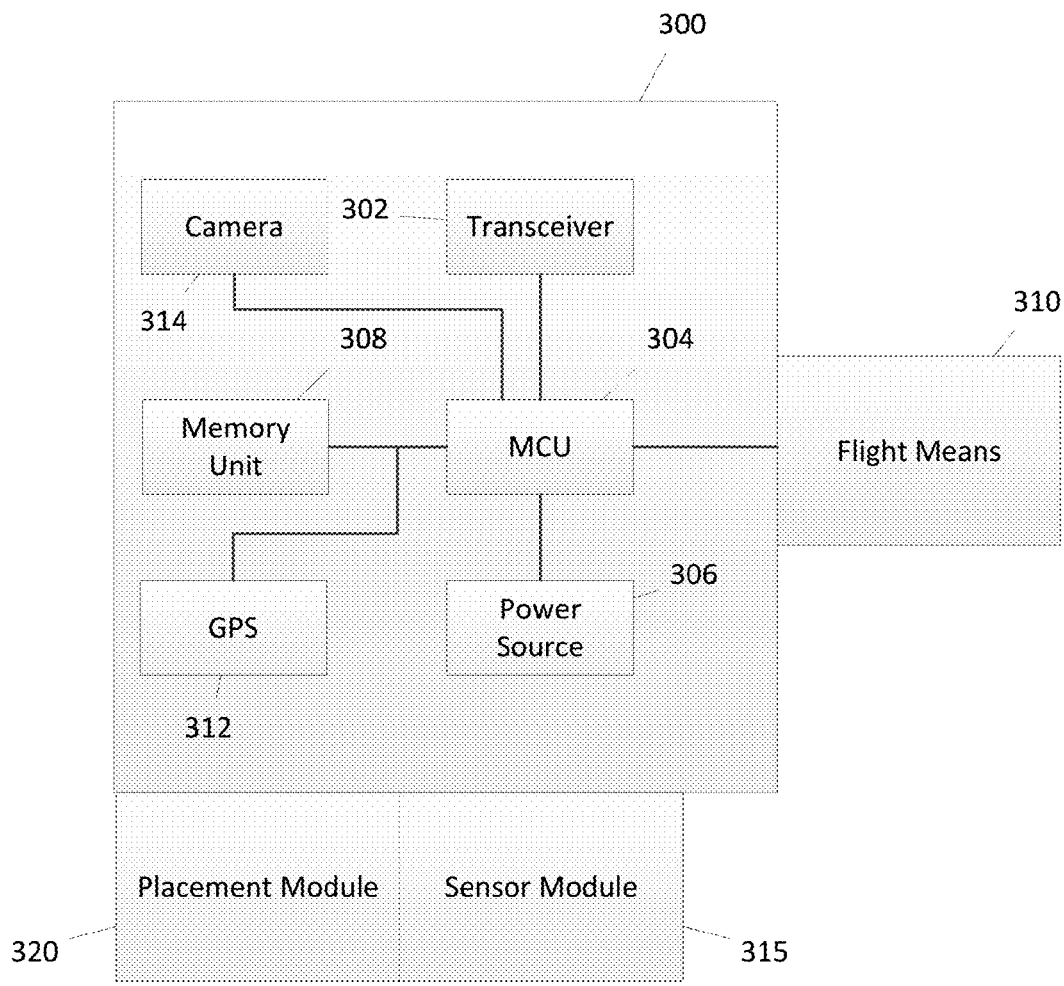
FIG. 7 is a schematic of an unmanned aerial vehicle.

Referring to FIG. 7, a standard embodiment of the UAV 300 is displayed. The UAV 300 has a central processing unit 304 which executes the instructions and missions transferred to the UAV 300. The central processing unit 304 is attached to a transceiver 302, a memory unit 308, a power source 306, a GPS unit 312, a charging means 314, a sensor module 315, a placement module 320 and a flight means 310. The memory unit 308 is any type of data storage component and may store information about the about current missions or objectives being executed by the UAV 300, the location of the nearest communication hub 120 or charging station, as well as any other relevant information. Additionally the memory unit 308 may be utilized to buffer data streams received from the server computer 100, communication hub 120, or charging station. The transceiver 302 sends and receives information to and from the server computer 100, communication hub 120, or charging station. In other embodiments the transceiver 302 may send and receive information through a wireless cellular network. The system may transmit mission data through the wireless cellular network. The information received in the transceiver 308 from the wireless cellular network may also permit the UAV 300 to triangulate its position based on signals received from cellular phone towers. The GPS unit 312 determines the global position of the UAV 300. The GPS unit 312 permits the server computer 100 to determine the location of the UAV 300 before and during its flight path to calculate the most efficient flight path or variations of the flight path. The power source 306 may be any type of battery configured to meet the energy needs of the UAV 300 to ensure power for flight of the UAV 300 and operation of the central processing unit 306, the transceiver 302, the memory unit 308, and the GPS unit 312. The power source may further comprise a charging means. The charging means is any component or circuitry configured to receive energy to resupply energy to the power source 306.

The sensor module 315 of the UAV 300 is a means to carry single or multiple sensors by the UAV 300. The sensor module 315 consists of sensors, a means to carry these sensors, a means to have the appropriate sensor ready for the UAV 300 to place. The sensor module 315 may comprise of a mechanism that carries multiple sensors and, based on the commands sent by the MCU 304, selects the appropriate sensors to be made ready for placement by the placement module 320.

The placement module 320 of the UAV 300 is a means to place the sensors that are carried by the sensor module 315. The placement module 320 may comprise of a screw or another type of rod that, by commands sent by the MCU 304, extends and retracts, placing the sensors fed by the sensor module 315. The placement module 320 may also comprise of a gas cylinder, or another means of projecting sensors, that pushes the sensors fed by the sensor module 315 to their appropriate placement location.

The flight means 310 of the UAV 300 is any type of motorized component or multiple components configured to generate sufficient lift to get the UAV 300 into flight. The flight means 310 may comprise one or more horizontal propellers. In other embodiments, the flight means 310 may comprise one or more set of wings and a vertical propeller. In other embodiments the flight means 310 may comprise one or more set of wings and a combustible jet engine.

The UAV may further comprise a camera 314. The camera 314 may be a still photograph camera or a video camera. The camera 314 takes visual images from the point of view of the UAV and feeds information back to the server computer 100, communication hub 120, and/or client computer 110.

Figure 8A:
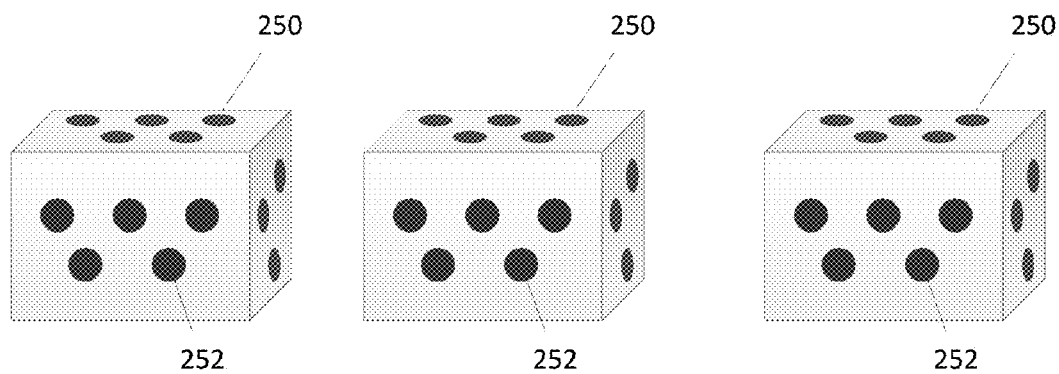
FIG. 8A is a view of a plurality of sensor encasements.
Figure 8B:
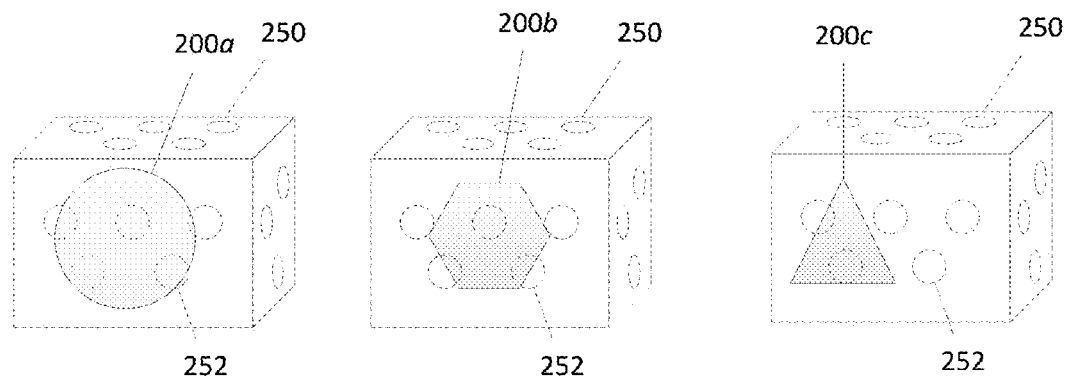
FIG. 8B is a view of a plurality of sensor encasements.

Referring to FIG. 8A and FIG. 8B, the preferred embodiment of the sensor encasement 250 is displayed. The sensor encasement 250 is an external protective casing for holding the sensor 200. The sensor encasement 250 may be made from any type of material. In the preferred embodiment the sensor encasement 250 is a rigid thermoplastic. In other embodiments the sensor encasement 250 is manufactured from metal. The sensor encasement 250 may contain one or more openings 252 to permit the sensor 200 to interact with the environment while the still being protected by the sensor encasement 250.

The sensor encasement 250 also provides a uniform size and shape for each sensor 200, permitting the UAV 300 to be configured in a simple design and easily interact with each sensor 200 regardless of the type, size, and shape of each individual sensor 200. As illustrated in FIG. 8B, each sensor 200a, 200b, and 200c is designed in a different size and shape. Each sensor encasement 250 provides a uniform structure for loading, carrying, and placement by the UAV 300. An additional embodiment is a mechanism within or attached to a sensor encasement 250 that rotates the sensor 200. For instance, a user could rotate the sensor 200 through instructions entered into a client device 110. In this example, the user can adjust the sensor 200, such as changing angles or views of video through a camera.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. The computerized methods disclosed herein may be performed solely on the computer system, solely on the communication hubs, solely on the unmanned aerial vehicles, solely on the sensors, or any combination thereof. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A computerized method for remotely controlling one or more unmanned aerial vehicles comprising:
  performing operations by a computer system comprising one or more transceivers, one or more microprocessors, and one or more nonvolatile memory units, said one or more nonvolatile memory units storing instructions which when executed by said one or more microprocessors cause the computer system to perform operations comprising:
    receiving one or more geographic sensor placement locations;
    receiving one or more sensor parameters;
      wherein said one or more sensor parameters is selected from the group consisting of: a type of sensor desired for placement, a duration of placement of a sensor, and an environmental attribute to be measured by a sensor;
    determining the geographic location of one or more sensors
      wherein said one or more sensors have one or more attributes consistent with said one or more received sensor parameters;
      wherein said one or more sensors are configured to be carried by said one or more unmanned aerial vehicles;
    respectively sending, via said one or more transceivers, one or more location query signals to said one or more unmanned aerial vehicles;
    respectively receiving, via said one or more transceivers, one or more location reply signals from said one or more unmanned aerial vehicles;
    calculating a geographic flight path for said one or more unmanned aerial vehicles;
      wherein said flight path includes said geographic locations of said one or more sensors and said geographic sensor placement locations;
    receiving a live video signal from an unmanned aerial vehicle;
    generating a display of said live video signal;
    receiving a user input indicating a precise placement location of a sensor at said geographic sensor placement location, said precise placement location being displayed as a part of said live video signal; and
    transmitting said user input indicating a precise placement location to an unmanned aerial vehicle;
  performing operations by one or more unmanned aerial vehicles, each of said one or more unmanned aerial vehicles comprising a flight means, one or more transceivers, one or more microprocessors and one or more nonvolatile memory units, said one or more nonvolatile memory units storing instructions which when executed by said one or more microprocessors cause the one or more aerial vehicles to perform operations comprising:
    respectively receiving, via said one or more transceivers, a location query signal;

respectively determining the geographic location of said one or more unmanned aerial vehicles; and respectively sending, via said one or more transceivers, a location reply signal to said computer system generating a live video signal via a camera incorporated in said unmanned aerial vehicle;

transmitting said live video signal to said computer system;

receiving a user input indicating a precise placement location for a sensor at said geographic sensor placement location;

determining a distance from the location of said unmanned aerial vehicle to said precise placement location; and placing, by said one or more unmanned aerial vehicles, one or more sensors at said precise placement location at said geographic sensor placement location.

2. The method as in claim 1 further comprising:

calculating by said computer system, one or more mission objectives
wherein said one or more mission objectives comprise placement of said one or more sensors at said one or more geographic sensor placement locations and executing flight along said geographic flight path; and calculating by said computer system, the energy needs of said one or more unmanned aerial vehicles required for executing said one or more mission objectives.

3. The method as in claim 2 further comprising:

respectively sending, via said one or more transceivers of said computer system, one or more power query signals to said one or more unmanned aerial vehicles;

respectively receiving, via said one or more transceivers of said computer system, one or more power reply signals from said one or more unmanned aerial vehicles said power reply signals indicating the respectively stored power supply on each respective unmanned aerial vehicle; and determining by said computer system, whether said power supply on each respective unmanned aerial vehicle is sufficient to perform said calculated one or more mission objectives;

performing operations by said one or more unmanned aerial vehicles, each of said one or more unmanned aerial vehicles further comprising a power source, said operations comprising:

respectively receiving, via said one or more transceivers of said one or more unmanned aerial vehicles, said power query signal;

respectively determining an amount of energy stored in said power source of each of said one or more unmanned aerial vehicles; and respectively sending, via said one or more transceivers of said one or more unmanned aerial vehicles, a power reply signal.

4. The method as in claim 3 further comprising:

establishing by said computer system, a preferred distance from said geographic flight path;

determining by said computer system, the geographic position of one or more unmanned aerial vehicles within said preferred distance from said geographic flight path; and determining by said computer system, the geographic position of one or more sensors within said preferred distance from said geographic flight path.

5. The method as in claim 4 further comprising:

generating by said computer system, a list of one or more unmanned aerial vehicles within said preferred distance of said geographic flight path.

6. The method as in claim 5 further comprising:

selecting by said computer system, one or more unmanned aerial vehicles from said generated list.

7. The method as in claim 6 further comprising:

selecting by said computer system, one or more sensors accessible to said one or more unmanned aerial vehicles from said generated list; and creating by said computer system, one or more mission objectives for placement of said one or more selected sensors at said one or more geographic sensor placement locations.

8. The method as in claim 7 further comprising:

assigning by said computer system, said one or more mission objectives to said one or more selected unmanned aerial vehicles;

generating by said computer system, one or more sets of instructions, wherein said one or more sets of instructions comprise one or more tasks required for execution of said one or more mission objectives by said one or more selected unmanned aerial vehicles;

transferring, via said one or more transceivers of said computer system, said one or more sets of instructions to said one or more selected unmanned aerial vehicles;

receiving, via said one or more transceivers of said one or more unmanned aerial vehicles selected by said computer system, said one or more sets of instructions.

9. The method as in claim 8 further comprising:

executing by said one or more unmanned aerial vehicles selected by said computer system, said one or more sets of instructions.

10. The method as in claim 9 further comprising:

sending, via said one or more transceivers of said one or more unmanned aerial vehicles, one or more sensor activation signals to said one or more sensors;

sending, via said one or more transceivers of said one or more unmanned aerial vehicles, one or more operational verification signals to said one or more sensors;

receiving, via said one or more transceivers of said one or more unmanned aerial vehicles, one or more confirmation signals from said one or more sensors;

transmitting, via said one or more transceivers of said one or more unmanned aerial vehicles, said one or more confirmation signals to said computer system;

performing operations by said one or more sensors, said one or more sensors comprising one or more transceivers, one or more microprocessors, and one or more nonvolatile memory units, said one or more nonvolatile memory units storing instructions which when executed by said one or more microprocessors cause the one or more sensors to perform operations comprising:

receiving one or more sensor activation signals from said one or more unmanned aerial vehicles;

activating the sensor operations in response to receiving said one or more sensor activation signals;

receiving one or more operational verification signals from said one or more unmanned aerial vehicles;

determining that said one or more said sensors is functioning properly; and sending one or more confirmation signals to said one or more unmanned aerial vehicles if said one or more sensors is functioning properly.

11. A method for remotely controlling one or more unmanned aerial vehicles comprising:

receiving one or more geographic sensor placement locations;
receiving one or more sensor parameters
  wherein said one or more sensor parameters is selected from the group consisting of: a type of sensor desired for placement, a duration of placement of a sensor, and an environmental attribute to be measured by a sensor;
determining the geographic location of one or more sensors
  wherein said one or more sensors have one or more attributes consistent with said one or more received sensor parameters;
  wherein said one or more sensors are configured to be carried by said one or more unmanned aerial vehicles;
respectively sending one or more location query signals to said one or more unmanned aerial vehicles;
respectively receiving one or more location reply signals from said one or more unmanned aerial vehicles;
calculating a geographic flight path for said one or more unmanned aerial vehicles
  wherein said flight path includes said geographic locations of said one or more sensors and said geographic sensor placement locations;
calculating one or more mission objectives
  wherein said one or more mission objectives comprises placement of said one or more sensors at said one or more geographic sensor placement locations and executing flight along said geographic flight path;
calculating the energy needs of said one or more unmanned aerial vehicles required for executing said one or more mission objectives;
determining whether the respective power supply on each of said one or more unmanned aerial vehicles is sufficient to perform said calculated one or more mission objectives independently or collectively;
selecting one or more unmanned aerial vehicles having, independently or collectively, sufficient power supply to perform said calculated one or more mission objectives;
assigning said one or more mission objectives to said one or more unmanned aerial vehicles;
generating one or more sets of instructions, wherein said one or more sets of instructions comprises one or more tasks required for execution of said one or more mission objectives by said one or more selected aerial vehicles;
transferring said one or more sets of instructions to said one or more selected unmanned aerial vehicles;
executing, by said one or more selected unmanned aerial vehicles, said one or more sets of instructions
placing, by said one or more selected unmanned aerial vehicles, one or more sensors;
sending, by said one or more selected unmanned aerial vehicles, one or more sensor activation signals to said one or more sensors;
receiving, by said one or more sensors, one or more sensor activation signals from said one or more unmanned aerial vehicles;
activating, by said one or more sensors, sensor operations in response to receiving said one or more sensor activation signals;
sending, by said one or more selected unmanned aerial vehicles, one or more operational verification signals to said one or more sensors;
receiving, by said one or more sensors, one or more operational verification signals from said one or more unmanned aerial vehicles;
determining, by said one or more sensors, that said one or more said sensors is functioning properly;
sending, by said one or more sensors, one or more confirmation signals to said one or more unmanned aerial vehicles if said one or more sensors is functioning properly;
receiving, by said one or more selected unmanned aerial vehicles, one or more confirmation signals from said one or more sensors; and
transmitting, by said one or more selected unmanned aerial vehicles, said one or more confirmation signals to a computer system.

12. The method as in claim 11 further comprising:
generating a live video signal via a camera incorporated in said unmanned aerial vehicle;
transmitting said live video signal to said computer system;
receiving a live video signal from an unmanned aerial vehicle;
generating a display of said live video signal;
receiving a user input indicating a precise placement location of a sensor at said geographic sensor placement location, said precise placement location being displayed as a part of said live video signal,
transmitting said user input indicating a precise placement location to an unmanned aerial vehicle;
determining, by said one or more unmanned aerial vehicles, a distance from the location of said unmanned aerial vehicle to said precise placement location;
placing, by said one or more unmanned aerial vehicles, one or more sensors at said precise placement location at said geographic sensor placement location.

13. A computerized method for remotely controlling one or more unmanned aerial vehicles comprising:
performing operations by a computer system comprising one or more transceivers, one or more microprocessors, and one or more nonvolatile memory units, said one or more nonvolatile memory units storing instructions which when executed by said one or more microprocessors cause the computer system to perform operations comprising
  receiving one or more geographic sensor placement locations;
  receiving one or more sensor parameters
    wherein said one or more sensor parameters is selected from the group consisting of: a type of sensor desired for placement, a duration of placement of a sensor, and an environmental attribute to be measured by the sensor;
  determining the geographic location of one or more sensors
    wherein said one or more sensors have one or more attributes consistent with said one or more received sensor parameters;
    wherein said one or more sensors are configured to be carried by one or more unmanned aerial vehicles;
  respectively sending, via said one or more transceivers, one or more location query signals to said one or more unmanned aerial vehicles;
  respectively receiving, via said one or more transceivers, one or more location reply signals from said one or more unmanned aerial vehicles;

calculating a geographic flight path for said one or more unmanned aerial vehicles
wherein said flight path includes said geographic locations of said one or more sensors and said geographic sensor placement locations;
performing operations by one or more unmanned aerial vehicles, each of said one or more unmanned aerial vehicles comprising a flight means, one or more transceivers, one or more microprocessors and one or more nonvolatile memory units, said one or more nonvolatile memory units storing instructions which when executed by said one or more microprocessors cause the one or more aerial vehicles to perform operations comprising
respectively receiving, via said one or more transceivers, a location query signal;
respectively determining the geographic location of said one or more unmanned aerial vehicles;
respectively sending, via said one or more transceivers, a location reply signal to said computer system;
sending, via said one or more transceivers, one or more sensor activation signals to said one or more sensors;
sending, via said one or more transceivers, one or more operational verification signals to said one or more sensors;
receiving, via said one or more transceivers, one or more confirmation signals from said one or more sensors;
transmitting, via said one or more transceivers, said one or more confirmation signals to said computer;
performing operations by said one or more sensors, said one or more sensors comprising one or more transceivers, one or more microprocessors, and one or more nonvolatile memory units, said one or more nonvolatile memory units storing instructions which when executed by said one or more microprocessors cause the one or more sensors to perform operations comprising
receiving one or more sensor activation signals from said one or more unmanned aerial vehicles;
activating the sensor operations in response to receiving said one or more sensor activation signals;
receiving one or more operational verification signals from said one or more unmanned aerial vehicles;
determining that said one or more said sensors is functioning properly; and
sending one or more confirmation signals to said one or more unmanned aerial vehicles if said one or more sensors is functioning properly.

14. The method as in claim 13 further comprising
calculating by said computer system, one or more mission objectives
wherein said one or more mission objective comprise placement of said one or more sensors at said one or more geographic sensor placement locations and executing flight along said geographic flight path; and
calculating by said computer system, the energy needs of said one or more unmanned aerial vehicles required for executing said one or more mission objectives.

15. The method as in claim 14 further comprising
respectively sending, via said one or more transceivers of said computer system, one or more power query signals to said one or more unmanned aerial vehicles;
respectively receiving, via said one or more transceivers of said computer system, one or more power reply signals from said one or more unmanned aerial vehicles;
said power reply signals indicating the respectively stored power supply on each respective unmanned aerial vehicle;
determining by said computer system, whether said power supply on each respective unmanned aerial vehicle is sufficient to perform said calculated one or more mission objectives;
performing operations by said one or more unmanned aerial vehicles, each of said one or more unmanned aerial vehicles further comprising a power source, said operations comprising:
respectively receiving, via said one or more transceivers of said one or more unmanned aerial vehicles, said power query signal;
respectively determining the amount of energy stored in said power source of each of said one or more unmanned aerial vehicles; and
respectively sending, via said one or more transceivers of said one or more unmanned aerial vehicles, a power reply signal.

16. The method as in claim 15 further comprising:
establishing by said computer system, a preferred distance from said geographic flight path;
determining by said computer system, the geographic position of one or more unmanned aerial vehicles within said preferred distance from said geographic flight path; and
determining by said computer system, the geographic position of one or more sensors within said preferred distance from said geographic flight path.

17. The method as in claim 16 further comprising:
generating by said computer system, a list of one or more unmanned aerial vehicles within said preferred distance of said geographic flight path.

18. The method as in claim 17 further comprising:
selecting by said computer system, one or more unmanned aerial vehicles from said generated list.

19. The method as in claim 18 further comprising
selecting by said computer system, one or more sensors accessible to said one or more unmanned aerial vehicles from said generated list; and
creating by said computer system, one or more mission objectives for placement of said one or more selected sensors at said one or more geographic sensor placement locations.

20. The method as in claim 19 further comprising
assigning by said computer system, said one or more mission objectives to said one or more selected unmanned aerial vehicles;
generating by said computer system, one or more sets of instructions, wherein said sets of instructions comprises one or more tasks required for execution of said one or more mission objectives by said one or more selected unmanned aerial vehicles;
transferring, via said one or more transceivers of said computer system, said one or more sets of instructions to said one or more selected unmanned aerial vehicles;
receiving, via said one or more transceivers of said one or more unmanned aerial vehicles selected by said computer system, said one or more sets of instructions; and
executing said one or more sets of instructions.

* * * * *